US012755616B2

(12) United States Patent
Son

(10) Patent No.: US 12,755,616 B2
(45) Date of Patent: Oct. 6, 2026

(54) METHOD AND APPARATUS BASED ON VISCOSITY VARIABLE HAPTIC GLOVE USING MR FLUID

(71) Applicant: ELECTRONICS AND TELECOMMUNICATIONS RESEARCH INSTITUTE, Daejeon (KR)

(72) Inventor: Hyung Ki Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1 day.

(21) Appl. No.: 18/955,130

(22) Filed: Nov. 21, 2024

(65) Prior Publication Data

US 2025/0166473 A1 May 22, 2025

(30) Foreign Application Priority Data

Nov. 22, 2023 (KR) ........................ 10-2023-0163754

(51) Int. Cl.
*G08B 6/00* (2006.01)

(52) U.S. Cl.
CPC ...................................... *G08B 6/00* (2013.01)

(58) Field of Classification Search
CPC ............ G08B 6/00; G06F 3/016; G06F 3/014
See application file for complete search history.

(56) References Cited

U.S. PATENT DOCUMENTS

| | | | | |
|---|---|---|---|---|
| 10,275,025 | B2 * | 4/2019 | Black | G06F 3/016 |
| 10,317,999 | B2 * | 6/2019 | Ahne | G06F 3/014 |
| 10,372,213 | B2 * | 8/2019 | Keller | G06F 3/014 |
| 10,474,236 | B1 * | 11/2019 | Stewart | G06F 3/016 |
| 10,782,782 | B1 * | 9/2020 | DeSalvo | G06F 3/016 |
| 10,809,804 | B2 * | 10/2020 | Goupil | G06F 3/016 |
| 10,845,876 | B2 * | 11/2020 | Buchanan | G06F 3/011 |
| 10,852,825 | B2 * | 12/2020 | Yoon | G06F 3/014 |
| 10,860,102 | B2 * | 12/2020 | Remaley | G02B 27/0172 |
| 10,976,820 | B2 * | 4/2021 | Ganadas | G06F 3/016 |

(Continued)

FOREIGN PATENT DOCUMENTS

| | | |
|---|---|---|
| CN | 111061377 A | 4/2020 |
| EP | 4 083 752 A1 | 11/2022 |

(Continued)

OTHER PUBLICATIONS

David J. Cassar et al., "A Force Feedback Glove Based on Magnetorheological Fluid: Prototype Development and Evaluation," ICABB-2010, Oct. 2010.

*Primary Examiner* — Hoi C Lau

(57) ABSTRACT

The present disclosure relates to a method and device based on a viscosity-variable haptic glove using MR fluid. A method for providing haptic feedback through a haptic glove according to an embodiment of the present disclosure may comprise: detecting an object in a virtual reality (VR) space; controlling an electromagnetic field for an actuator based on a magneto-rheological fluid (MR fluid) mounted on the haptic glove based on properties of the detected object; and providing haptic feedback to a user of the haptic glove using properties of the MR fluid that change based on the controlled electromagnetic field.

20 Claims, 7 Drawing Sheets

(56) References Cited

U.S. PATENT DOCUMENTS

| | | | | |
|---|---|---|---|---|
| 11,009,959 | B1 * | 5/2021 | Piazza | G02B 27/0172 |
| 11,023,047 | B2 * | 6/2021 | Holbery | G06F 3/011 |
| 11,036,295 | B2 * | 6/2021 | Moessinger | F16D 28/00 |
| 11,054,905 | B2 * | 7/2021 | Remaley | G06F 3/014 |
| 11,061,476 | B2 * | 7/2021 | Remaley | B25J 9/0006 |
| 11,112,868 | B1 * | 9/2021 | Stewart | G06F 3/016 |
| 11,132,058 | B1 * | 9/2021 | Gupta | G06F 3/017 |
| 11,199,901 | B2 * | 12/2021 | Klein | G06F 3/014 |
| 11,422,624 | B2 * | 8/2022 | Buchanan, IV | G06F 3/011 |
| 11,424,299 | B2 | 8/2022 | Oh et al. | |
| 11,500,465 | B1 * | 11/2022 | Piazza | G06F 3/014 |
| 11,656,684 | B2 | 5/2023 | Xiong et al. | |
| 11,899,841 | B2 * | 2/2024 | Shin | G06F 3/016 |
| 11,989,347 | B2 * | 5/2024 | Shin | G06F 1/163 |
| 12,189,851 | B1 * | 1/2025 | Gupta | G06T 19/006 |
| 12,340,023 | B2 * | 6/2025 | Shin | G06F 3/014 |
| 2014/0337724 | A1 * | 11/2014 | Tremblay | G06F 3/016 715/701 |
| 2016/0274662 | A1 * | 9/2016 | Rimon | G06F 3/16 |
| 2016/0363997 | A1 * | 12/2016 | Black | G06F 3/014 |
| 2017/0131769 | A1 * | 5/2017 | Keller | G06F 3/011 |
| 2017/0131770 | A1 * | 5/2017 | Keller | G06F 3/011 |
| 2017/0168576 | A1 * | 6/2017 | Keller | G06F 3/014 |
| 2017/0185152 | A1 * | 6/2017 | Keller | G06F 3/016 |
| 2017/0262056 | A1 * | 9/2017 | Osman | G06F 3/0304 |
| 2018/0335842 | A1 | 11/2018 | Rubin et al. | |
| 2018/0356893 | A1 * | 12/2018 | Soni | G06F 3/014 |
| 2019/0113971 | A1 * | 4/2019 | Ahne | G06F 3/014 |
| 2019/0377412 | A1 * | 12/2019 | Parastegari | G06F 3/016 |
| 2020/0019245 | A1 * | 1/2020 | Ganadas | G06F 3/016 |
| 2020/0142490 | A1 * | 5/2020 | Xiong | G06F 3/014 |
| 2021/0081048 | A1 * | 3/2021 | Sedal | G06F 3/016 |
| 2021/0096649 | A1 * | 4/2021 | Mok | G06F 3/016 |
| 2022/0111290 | A1 * | 4/2022 | Buchanan, IV | G06F 3/011 |
| 2023/0152930 | A1 | 5/2023 | Park et al. | |
| 2025/0166473 | A1 * | 5/2025 | Son | G08B 6/00 |

FOREIGN PATENT DOCUMENTS

| | | |
|---|---|---|
| KR | 10-2020-0131587 A | 11/2020 |
| KR | 10-2022-0068106 | 5/2022 |

* cited by examiner

METHOD AND APPARATUS BASED ON VISCOSITY VARIABLE HAPTIC GLOVE USING MR FLUID

CROSS-REFERENCE TO RELATED APPLICATION

This application claims the benefit of earlier filing date and right of priority to Korean Patent Application No. 10-2023-0163754, filed on Nov. 22, 2023, the contents of which are all hereby incorporated by reference herein in their entirety.

TECHNICAL FIELD

The present disclosure relates to a method and device based on a viscosity-variable haptic glove using a magneto-rheological fluid (MR fluid).

BACKGROUND

As virtual reality (VR) technology becomes an issue in areas such as the metaverse and full-body tracking VR methods increase, various studies are being conducted to provide haptic feedback in the sensory field.

For example, various types of haptic gloves are being commercialized to interact with objects in virtual space, and methods for conveying tactile sensation and methods for conveying force are mainly being discussed/developed.

However, in the case of most haptic gloves, the sense of touch is delivered through haptic feedback using a vibration motor, and the force is delivered through wires and/or a wearable robot (e.g., exoskeleton, etc.).

SUMMARY

The technical object of the present disclosure is to provide a haptic glove for expressing the shape, stiffness, and/or viscosity of an object when interacting with the object in a virtual space, and a method for transferring haptic feedback based on the haptic glove.

The technical object of the present disclosure is to provide a method and device for transferring sensation through electromagnetic force control by mounting an actuator using magneto-rheological fluid (MR fluid) on each finger joint in a haptic glove.

The technical objects to be achieved by the present disclosure are not limited to the above-described technical objects, and other technical objects which are not described herein will be clearly understood by those skilled in the pertinent art from the following description.

A method for providing haptic feedback through a haptic glove according to an aspect of the present disclosure may comprise: detecting an object in a virtual reality (VR) space; controlling an electromagnetic field for an actuator based on a magneto-rheological fluid (MR fluid) mounted on the haptic glove based on properties of the detected object; and providing haptic feedback to a user of the haptic glove using properties of the MR fluid that change based on the controlled electromagnetic field.

An apparatus of providing haptic feedback through a haptic glove according to an additional aspect of the present disclosure may comprise at least one processor and at least one memory, wherein the processor may be configured to: detect an object in a virtual reality (VR) space; control an electromagnetic field for an actuator based on a magneto-rheological fluid (MR fluid) mounted on the haptic glove based on properties of the detected object; and provide haptic feedback to a user of the haptic glove using properties of the MR fluid that change based on the controlled electromagnetic field.

As one or more non-transitory computer readable medium storing one or more instructions according to an additional aspect of the present disclosure, wherein the one or more instructions may be executed by one or more processors and control an apparatus for providing haptic feedback through a haptic glove to: detect an object in a virtual reality (VR) space; control an electromagnetic field for an actuator based on a magneto-rheological fluid (MR fluid) mounted on the haptic glove based on properties of the detected object; and provide haptic feedback to a user of the haptic glove using properties of the MR fluid that change based on the controlled electromagnetic field.

In various aspects of the present disclosure, a plurality of MR fluid-based actuators may be mounted on each finger of the haptic glove, and the plurality of MR fluid-based actuators may be connected to a fixed structure of the haptic glove using an elastic line and a non-elastic line.

Additionally, in various aspects of the present disclosure, the elastic line may be connected to one side of a MR fluid-based actuator, and the non-elastic line is connected to the other side of a MR fluid-based actuator.

Additionally, in various aspects of the present disclosure, if a finger portion of the haptic glove equipped with a MR fluid-based actuator is bent, the piston of the MR fluid-based actuator may be designed to be compressed based on the line that does not have elasticity.

Additionally, in various aspects of the present disclosure, if a finger portion of the haptic glove equipped with a MR fluid-based actuator is spread, a piston of the MR fluid-based actuator may be designed to be restored based on the elastic line.

Additionally, in various aspects of the present disclosure, if the electromagnetic field is applied to the MR fluid, a hard expression haptic feedback may be provided as particles of the MR fluid grow larger.

Additionally, in various aspects of the present disclosure, if the electromagnetic field is not applied to the MR fluid, a soft haptic feedback may be provided as particles of the MR fluid become smaller.

Additionally, in various aspects of the present disclosure, the electromagnetic field may be generated by a coil surrounding a MR fluid within the actuator.

Additionally, in various aspects of the present disclosure, a signal controlling the electromagnetic field may be generated based on a change in detection of one or more sensors mounted on the haptic glove, and the one or more sensors may include at least one of a pressure sensor or an electromyography (EMG) sensor.

According to the present disclosure, a haptic glove capable of variably expressing the shape and viscosity of an object using MR fluid can provide various haptic feedbacks when a user interacts with an object in a virtual space.

According to the present disclosure, unlike existing methods, it is possible to provide material feedback rather than simple feedback, and can be applied to VR contents such as metaverse to provide new experiences to users.

The effects obtainable from the present disclosure are not limited to the effects mentioned above, and other effects not mentioned will be clearly understood by a person skilled in the art to which the present disclosure belongs from the description below.

DETAILED DESCRIPTION

Figure 1:
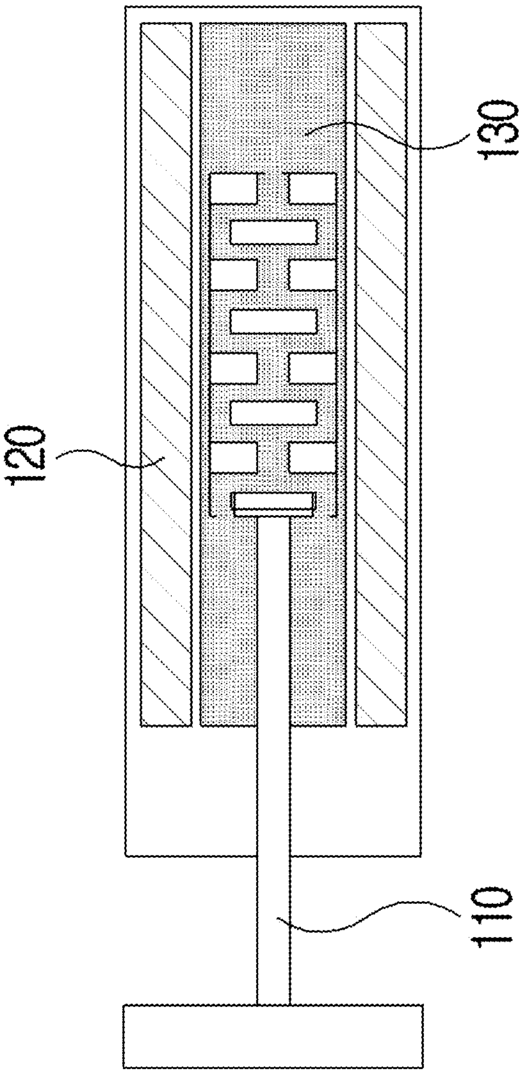
FIG. 1 illustrates an MR fluid-based actuator according to an embodiment of the present disclosure.

As the present disclosure may make various changes and multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

The proposed method and device in the present disclosure relate to a haptic glove that expresses the shape of an object and the strength and/or viscosity of a material by applying a new method rather than a conventional haptic feedback method.

Specifically, the present disclosure describes a haptic glove for virtual reality (VR) that uses magneto-rheological fluid (MR fluid) to enable a user to realistically feel an object when interacting with the object in a VR space.

Here, MR fluid refers to a material whose properties change from a fluid to a solid depending on magnetic force.

In the case of the haptic glove proposed in the present disclosure, a sensation may be reproduced by mounting a small actuator using MR fluid on each finger joint in the haptic glove and then generating and controlling electromagnetic force.

That is, the properties of the MR fluid change depending on the electromagnetic force, and depending on the changed properties, it may be expressed as a hard feeling, a soft feeling, or a sticky feeling. For example, depending on the magnetic force inside the actuator, a solid-like hard texture, a rubber-like flexible feeling, and/or a clay-like texture can be expressed when compressed/extended.

Specifically, when wearing a glove based on MR fluid and touching an object in a virtual space, the density of the MR fluid within the actuator may be increased to solidify the object, allowing the user to feel the shape. In contrast, when touching a soft object, the density of the MR fluid within the actuator may be decreased, allowing the user to feel a change.

Hereinafter, a (small) actuator using MR fluid proposed in the present disclosure and a haptic glove equipped with the actuator are specifically described.

FIG. 1 illustrates an MR fluid-based actuator according to an embodiment of the present disclosure.

Referring to FIG. 1, an MR fluid-based actuator used in a haptic glove may include a piston (110), a coil (120), and an MR fluid (130).

In this regard, the piston (110) may correspond to a structure for compressing/extending the actuator, and the coil (120) may correspond to a structure for controlling the electromagnetic properties of the MR fluid (130).

For MR fluid (130), the characteristics of the fluid may be controlled by changing the properties based on the electromagnetic force generated by the coil (120) as described above.

Figure 2:
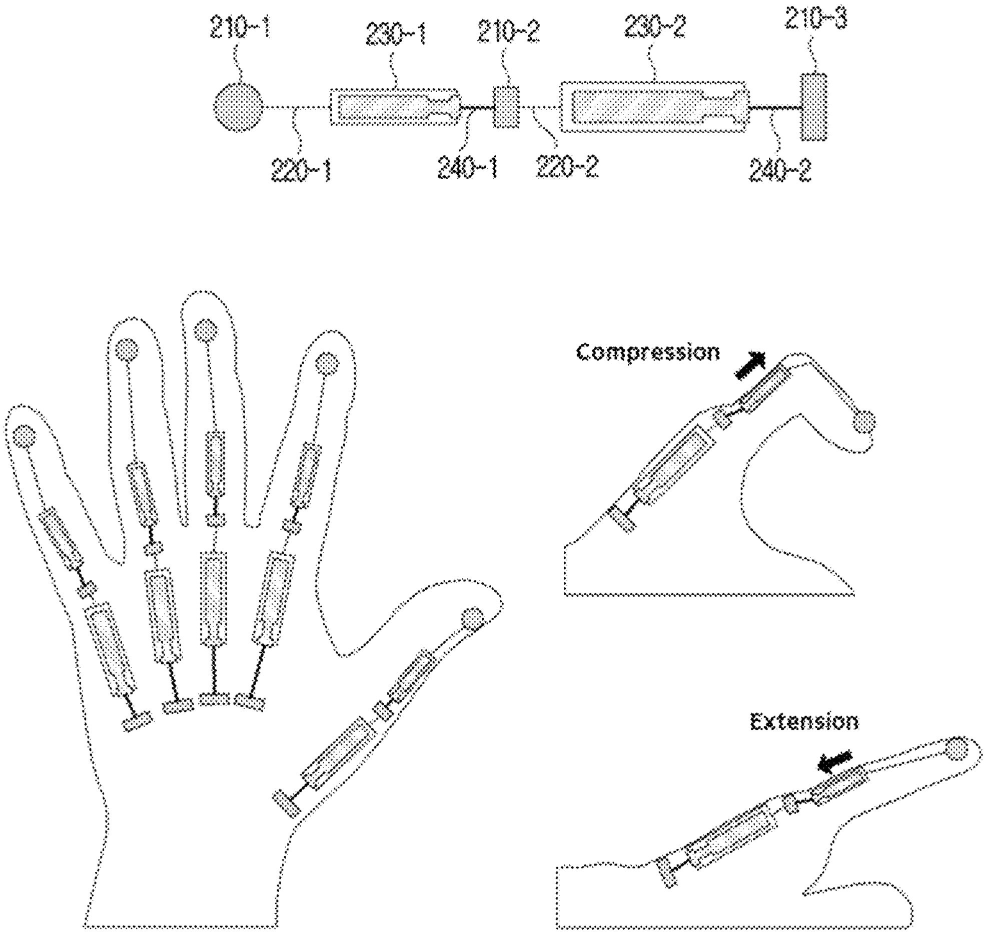
FIG. 2 illustrates a haptic glove structure using an MR fluid-based actuator according to an embodiment of the present disclosure.

FIG. 2 illustrates a haptic glove structure using an MR fluid-based actuator according to an embodiment of the present disclosure.

The shape/form illustrated in FIG. 2 may be an example, and if an actuator of a different shape/form is applied to perform the same function, it is not excluded from the scope of the present disclosure.

Referring to FIG. 2, two actuators transmit force to each finger, and each actuator may be controlled separately.

In this regard, as illustrated in FIG. 2, for the thumb, the small actuator is located at the second joint, for the remaining fingers, the small actuator is located at the third joint, and additional actuators may be located on the back of the hand for each finger.

For example, based on the first fixed structure (210-1) located at the tip of each finger, each finger and back of the hand portion of the haptic glove may be designed in the following order: a first inelastic line (220-1), a first actuator (230-1), a first elastic line (240-1), a second fixed structure (210-2), a second inelastic line (220-2), a second actuator (230-2), a second elastic line (240-2), and a third fixed structure (210-3).

At this time, when the finger is bent, the first inelastic line (220-1) may be pulled and the first actuator (230-1) may be compressed. On the other hand, when the force of the finger is released, the first actuator (230-1) may be restored by being extended/stretched by the first elastic line (240-1).

That is, the small actuators for each finger joint are connected by a line having elasticity (i.e., an elastic line), and the elasticity is not strong and may be used to restore the piston within the actuator. As in FIG. 2, the piston portion of the actuator where compression takes place and the portion where the finger is connected are connected by a line having no elasticity (i.e., an inelastic line), and may be connected separately from the line having elasticity for restoration purposes.

Through the structure described above, force may be applied to each finger according to changes in the user's fingers.

Figure 3:
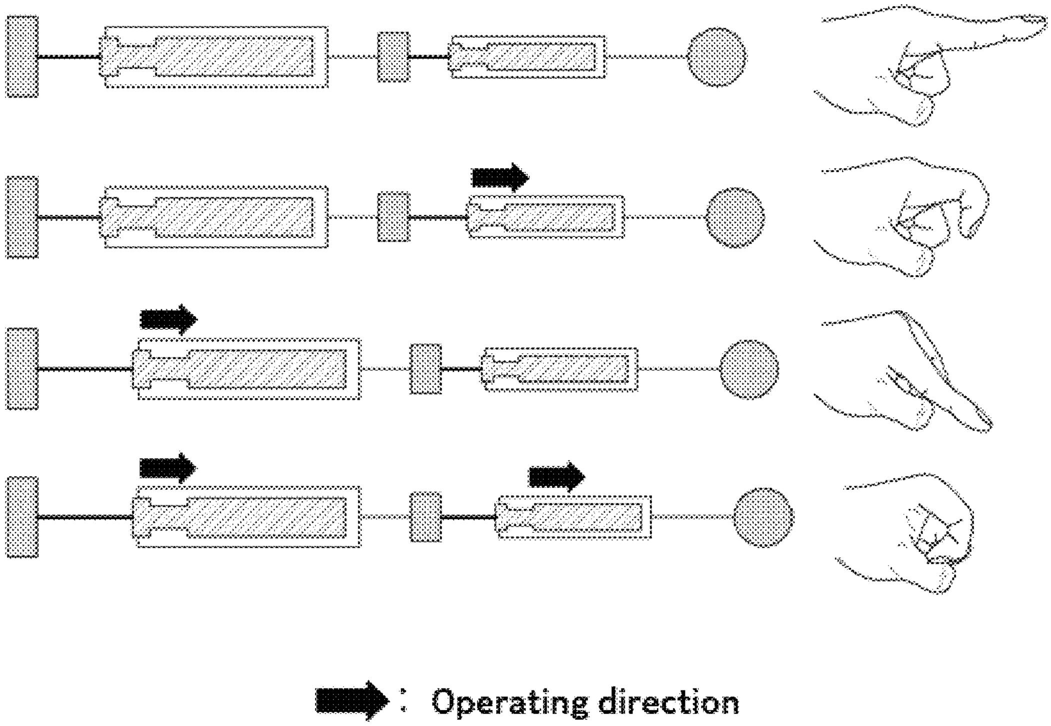
FIG. 3 illustrates an operation method according to finger bending in a haptic glove structure according to an embodiment of the present disclosure.

FIG. 3 illustrates an operation method according to finger bending in a haptic glove structure according to an embodiment of the present disclosure.

Referring to FIG. 3, compression or extension of the actuator may be performed by an inelastic line and/or an elastic line connected between the fixed structure and the actuator.

For example, when only the finger is bent, an actuator (e.g., the first actuator (230-1)) connected to a fixed structure at the tip of the finger by an inelastic line may be compressed by an elastic line connected to the actuator.

For another example, when only the back of the hand is bent, an actuator (e.g., the second actuator (230-2)) connected to a fixed structure at the end in the back of the hand by an elastic line may be compressed by the elastic line connected to the actuator.

As another example, when bending the back of the hand and fingers, both actuators may be compressed.

Referring to the actuator operation/driving in the examples described above, haptic feedback may be provided in a VR space by changing the properties of the MR fluid.

In the present disclosure, an MR fluid-based actuator is used to enable the haptic glove to vary the haptic feedback to suit different environments.

As mentioned above, MR fluid is a material whose properties change depending on magnetism. That is, for example, MR fluid is composed of a material mixed with iron particles and oil, and has liquid properties when not affected by a magnetic field, but when affected by a magnetic field, the arrangement of the particles changes, changing the viscosity and allowing it to have solid-like properties.

In this disclosure, a haptic glove capable of expressing various sensations is proposed by mounting a small actuator capable of controlling the properties of MR fluid as described above using an electromagnetic field.

As shown in FIG. 1, the miniature actuator has a space inside which MR fluid may move, and a coil surrounds the space.

When the miniature actuator is extended and compressed, the MR fluid may flow through a set path, and may be operated in a flow mode inside and in a shear mode on the outer wall.

Figure 4:
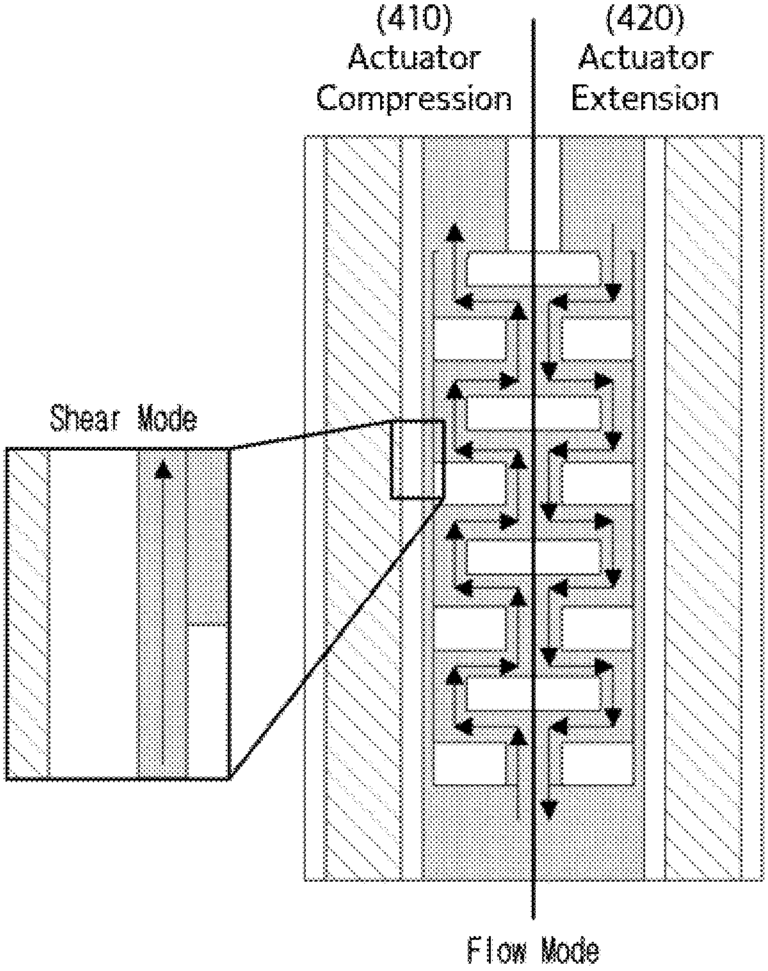
FIG. 4 illustrates flow mode and shear mode in an actuator according to an embodiment of the present disclosure.

FIG. 4 illustrates flow mode and shear mode in an actuator according to an embodiment of the present disclosure.

Referring to FIG. 4, the MR fluid may flow in the opposite direction when the actuator is extended (420) compared to when the actuator is compressed (410).

At this time, an electromagnetic field may be generated according to the power flowing through the coil, and the characteristics of the MR fluid may be changed according to the strength of the electromagnetic field. Based on the properties of the MR fluid, various haptic feedbacks may be provided to the fingers through the haptic glove.

When a user interacts with an object in a VR space, haptic feedback may be provided by operating a small actuator in a specific area.

That is, when a user wears the haptic glove proposed in the present disclosure and touches an object in a VR space, the object is recognized and the electromagnetic field within the small actuator is changed (e.g., the intensity of the electromagnetic field is strongly changed), thereby changing the MR fluid properties within the haptic glove.

For example, the transformed MR fluid could have a physical force inside the small actuator to prevent the user from bending their finger in the direction of the object (e.g., solidifying the MR fluid). Additionally, when moving in the opposite direction of the object, the MR fluid could change back to a liquid-like form as the strength of the electromagnetic field decreases.

Additionally or alternatively, the electromagnetic field applied to the MR fluid-based haptic glove may be generated based on the shape of a specific waveform, rather than simply being turned on/off.

In this case, the properties of the MR fluid may change depending on the waveform, and this allows the user to feel various sensations. For example, when the frequency of the wave increases, the user may feel as if they are touching an elastic object as the properties of the MR fluid continue to change.

In order to control the electromagnetic field of a MR-based small actuator, a control device for driving, a battery, a sensor (e.g., an EMG (electromyography) sensor, etc.) may be mounted on the wrist/arm portion.

For example, an EMG sensor may detect changes when a user interacts with an object, such as when a virtual object is picked up and then released, and may be involved in controlling the electromagnetic fields of a MR-based miniature actuator.

Additionally, a pressure sensor may be mounted on each fingertip, and when the strength of the pressure sensor changes, it may be determined that the user is releasing force and releasing the virtual object. At this time, the EMG sensor and the pressure sensor may be checked in parallel to weaken the electromagnetic field of the small actuator, thereby allowing the user's finger to move.

Figure 5:
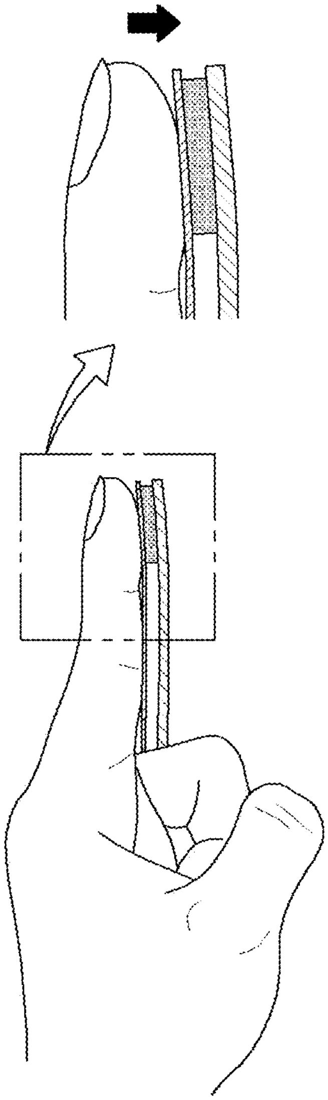
FIG. 5 illustrates changes in the contact surface within a haptic glove that may be applied to an embodiment of the present disclosure.

FIG. 5 illustrates changes in the contact surface within a haptic glove that may be applied to an embodiment of the present disclosure.

Referring to FIG. 5, a pressure sensor may be mounted on the tip of a finger.

When a user grabs an object, i.e., when the user applies force, pressure is applied to the pressure sensor, and in this case, the electromagnetic field of the small actuator may be strongly controlled to change the properties of the MR fluid to be similar to a solid. Through this, the user may be controlled so that he or she may not move his or her fingers as if he or she is grabbing an object.

In contrast, when the user releases the object, i.e., releases the force, the intensity of the pressure sensor changes, and in this case, the electromagnetic field of the small actuator can be weakly controlled to change the properties of the MR fluid to be similar to a liquid. Through this, the user can be controlled to move his or her finger as if he or she is releasing the object.

As described above in the present disclosure, the electromagnetic force may be controlled by operating the MR fluid-based miniature actuator, and based on this, various sensations, i.e., haptic feedback, may be provided to the user.

Since the particle size of the MR fluid changes depending on the electromagnetic force, the internal resistance may change when the actuator is compressed.

For example, when no electromagnetic force is applied, the MR fluid has liquid-like properties and may move smoothly. In contrast, when an electromagnetic force is applied, the user may feel the viscosity change as the particles of the MR fluid grow larger. Finally, when the particles are clumped together the largest, the MR fluid cannot flow through the passages within the actuator, and the actuator does not move, so a hard expression may be possible. If only a weak electromagnetic force is applied, the user may feel a sensation similar to touching a soft object such as rubber, based on a small actuator based on MR fluid.

Additionally, when controlling the electromagnetic force through the waveform, a feeling like tactile feedback can be provided to the user by momentarily alternating between the feeling of a solid and a liquid. At this time, the user can momentarily feel a vibration.

Figure 6:
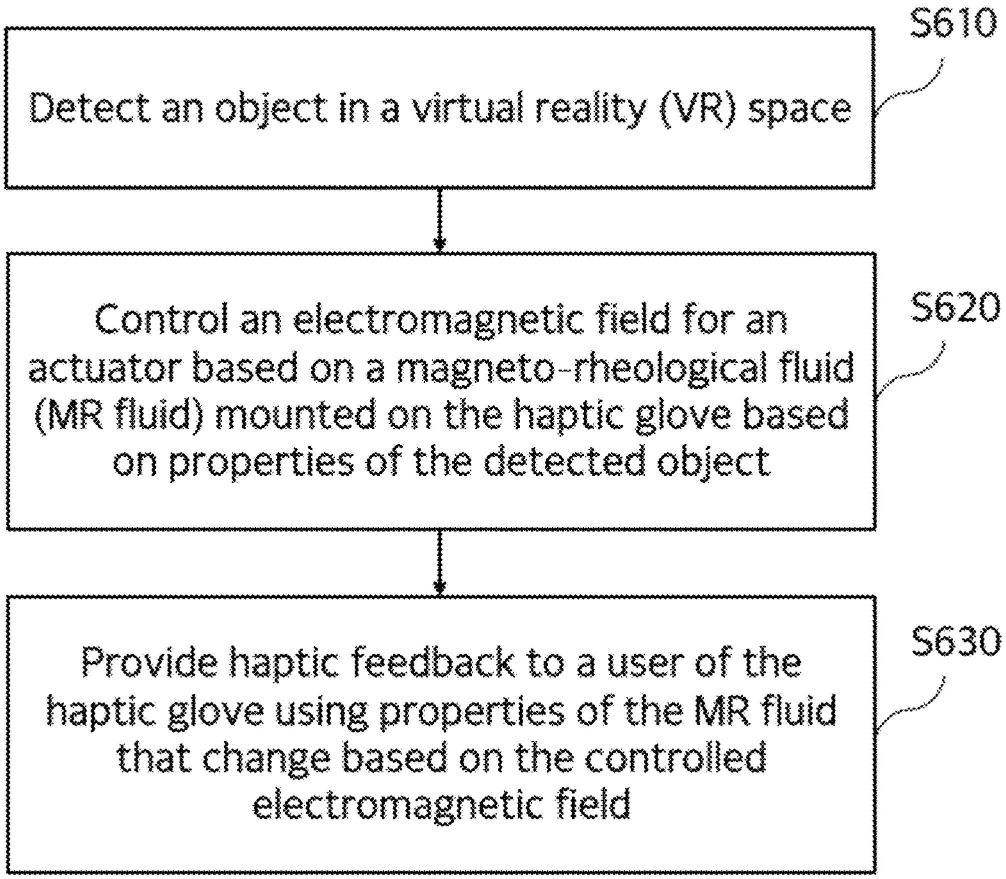
FIG. 6 illustrates an operational flowchart f of a method for providing haptic feedback using an MR fluid-based haptic glove according to an embodiment of the present disclosure.

FIG. 6 illustrates an operational flowchart of a method for providing haptic feedback using an MR fluid-based haptic glove according to an embodiment of the present disclosure.

The procedure described in FIG. 6 may be based on the haptic glove-related methods/devices and examples described above in the present disclosure.

Referring to FIG. 6, an object may be detected in a virtual reality (VR) space (S610).

Thereafter, based on the properties of the detected object, an electromagnetic field for an MR fluid-based actuator mounted on the haptic glove may be controlled (S620).

For example, the electromagnetic field may be generated by a coil surrounding the MR fluid within the actuator.

Additionally or alternatively, the signal controlling the electromagnetic field is generated based on a change in detection of one or more sensors mounted on the haptic glove, wherein the one or more sensors may include at least one of a pressure sensor or an electromyography (EMG) sensor.

In this regard, a plurality of MR fluid-based actuators are mounted on each finger of the haptic glove, and the plurality of MR fluid-based actuators may be connected to a fixed structure of the haptic glove using elastic and non-elastic lines.

Here, the elastic line may be connected to one side of the MR fluid-based actuator, and the non-elastic line may be connected to the other side of the MR fluid-based actuator.

For example, when a finger portion of the haptic glove equipped with an MR fluid-based actuator is bent, the piston of the MR fluid-based actuator may be designed to be compressed based on the non-elastic line.

As another example, when the finger portion of the haptic glove equipped with the MR fluid-based actuator is extended, the piston of the MR fluid-based actuator can be designed to be restored based on the elastic line.

As described above, haptic feedback may be provided to a user of a haptic glove by utilizing the properties of an MR fluid that change based on a controlled electromagnetic field (S630).

For example, when the electromagnetic field is applied to the MR fluid, a hard haptic feedback may be provided as the particles of the MR fluid become larger. As another example, when the electromagnetic field is not applied to the MR fluid, a soft haptic feedback may be provided as the particles of the MR fluid become smaller.

Figure 7:
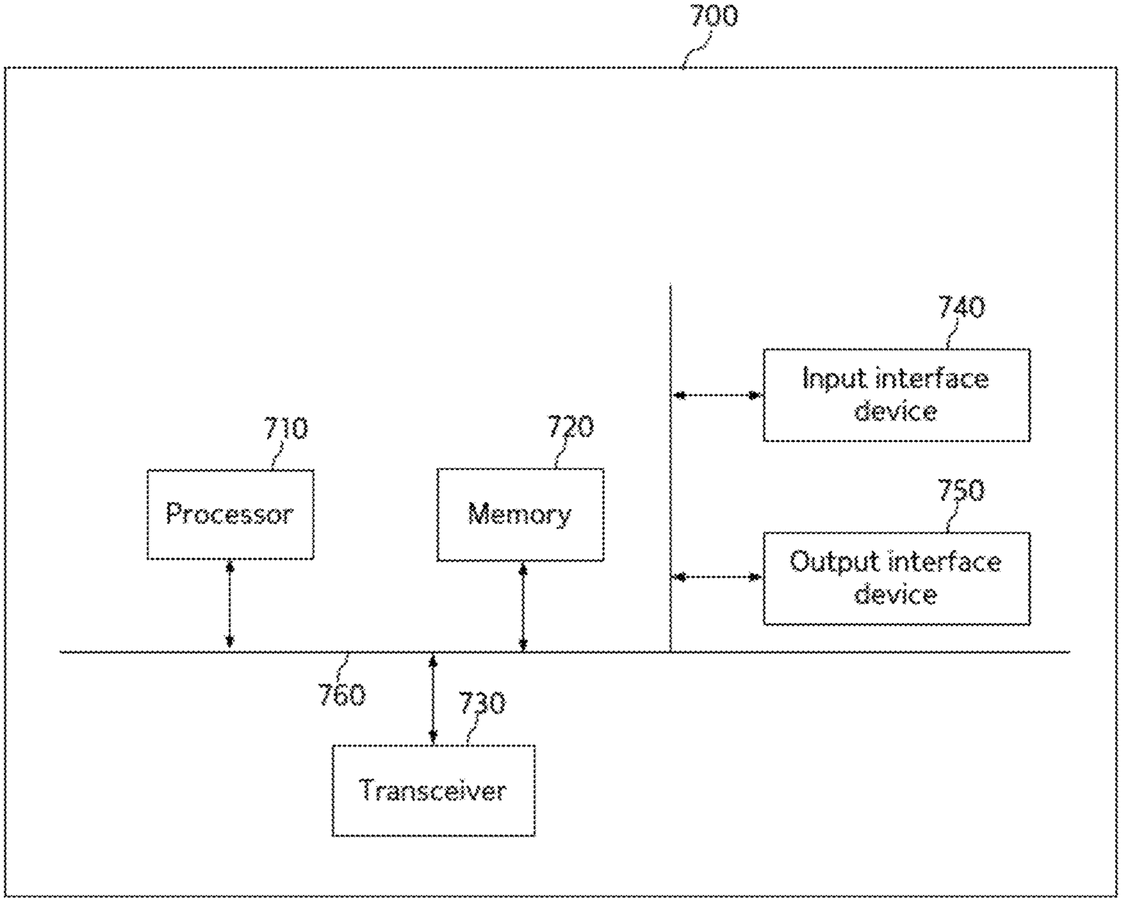
FIG. 7 is a block diagram illustrating a device according to an embodiment of the present disclosure.

FIG. 7 is a block diagram illustrating an apparatus according to an embodiment of the present disclosure.

Referring to FIG. 7, a device (700) may represent a device implementing a method for providing haptic feedback using an MR fluid-based haptic glove described in the present disclosure.

The device 700 may include at least one of a processor 710, a memory 720, a transceiver 730, an input interface device 740, and an output interface device 750. Each of the components may be connected by a common bus 760 to communicate with each other. In addition, each of the components may be connected through a separate interface or a separate bus centering on the processor 910 instead of the common bus 760.

The processor 910 may be implemented in various types such as an application processor (AP), a central processing unit (CPU), a graphic processing unit (GPU), etc., and may be any semiconductor device that executes a command stored in the memory 920. The processor 910 may execute a program command stored in the memory 920. The processor (710) may be configured to implement a method and device for providing haptic feedback using an MR fluid-based haptic glove based on FIGS. 1 to 6 described above.

And/or, the processor 710 may store a program command for implementing at least one function for the corresponding modules in the memory 720 and may control the operation described based on FIGS. 1 to 6 to be performed.

The memory 720 may include various types of volatile or non-volatile storage media. For example, the memory 720 may include read-only memory (ROM) and random access memory (RAM). In an embodiment of the present disclosure, the memory 720 may be located inside or outside the processor 710, and the memory 720 may be connected to the processor 710 through various known means.

The transceiver 730 may perform a function of transmitting and receiving data processed/to be processed by the processor 710 with an external device and/or an external system.

The input interface device 740 is configured to provide data to the processor 710.

The output interface device 750 is configured to output data from the processor 710.

According to the present disclosure, a haptic glove capable of variably expressing the shape and viscosity of an object using MR fluid may provide various haptic feedbacks when a user interacts with an object in a virtual space.

According to the present disclosure, unlike existing methods, it is possible to provide material feedback rather than simple feedback, and may be applied to VR contents such as metaverse to provide new experiences to users.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method for providing haptic feedback through a haptic glove, the method comprising:

detecting an object in a virtual reality (VR) space;

controlling an electromagnetic field for an actuator based on a magneto-rheological fluid (MR fluid) mounted on the haptic glove based on properties of the detected object; and providing haptic feedback to a user of the haptic glove using properties of the MR fluid that change based on the controlled electromagnetic field, wherein, when the actuator is compressed or extended, the MR fluid flows through a set path within the actuator and undergoes a flow mode within internal passages of the actuator and a shear mode on outer walls of the internal passages.

2. The method of claim 1, wherein a plurality of MR fluid-based actuators are mounted on each finger of the haptic glove, and wherein the plurality of MR fluid-based actuators are connected to a fixed structure of the haptic glove using an elastic line and a non-elastic line.

3. The method of claim 2, wherein the elastic line is connected to one side of a MR fluid-based actuator, and wherein the non-elastic line is connected to the other side of a MR fluid-based actuator.

4. The method of claim 3, wherein, if a finger portion of the haptic glove equipped with a MR fluid-based actuator is bent, the piston of the MR fluid-based actuator is designed to be compressed based on the line that does not have elasticity.

5. The method of claim 3, wherein, if a finger portion of the haptic glove equipped with a MR fluid-based actuator is spread, a piston of the MR fluid-based actuator is designed to be restored based on the elastic line.

6. The method of claim 1, wherein, if the electromagnetic field is applied to the MR fluid, a hard expression haptic feedback is provided as particles of the MR fluid grow larger, and wherein, if the electromagnetic field is not applied to the MR fluid, a soft haptic feedback is provided as particles of the MR fluid become smaller.

7. The method of claim 1, wherein the electromagnetic field is generated by a coil surrounding a MR fluid within the actuator.

8. The method of claim 1, wherein a signal controlling the electromagnetic field is generated based on a change in detection of one or more sensors mounted on the haptic glove, and wherein the one or more sensors include at least one of a pressure sensor or an electromyography (EMG) sensor.

9. An apparatus of providing haptic feedback through a haptic glove, the apparatus comprising:

at least one processor and at least one memory, wherein the processor is configured to:

detect an object in a virtual reality (VR) space;

control an electromagnetic field for an actuator based on a magneto-rheological fluid (MR fluid) mounted on the haptic glove based on properties of the detected object; and provide haptic feedback to a user of the haptic glove using properties of the MR fluid that change based on the controlled electromagnetic field, wherein, when the actuator is compressed or extended, the MR fluid flows through a set path within the actuator and undergoes a flow mode within internal passages of the actuator and a shear mode on outer walls of the internal passages.

10. The apparatus of claim 9, wherein a plurality of MR fluid-based actuators are mounted on each finger of the haptic glove, and wherein the plurality of MR fluid-based actuators are connected to a fixed structure of the haptic glove using an elastic line and a non-elastic line.

11. The apparatus of claim 10, wherein the elastic line is connected to one side of a MR fluid-based actuator, and wherein the non-elastic line is connected to the other side of a MR fluid-based actuator.

12. The apparatus of claim 11, wherein, if a finger portion of the haptic glove equipped with a MR fluid-based actuator is bent, a piston of the MR fluid-based actuator is designed to be compressed based on the line that does not have elasticity.

13. The apparatus of claim 11, wherein, if a finger portion of the haptic glove equipped with a MR fluid-based actuator is spread, a piston of the MR fluid-based actuator is designed to be restored based on the elastic line.

14. The apparatus of claim 9, wherein, if the electromagnetic field is applied to the MR fluid, a hard expression haptic feedback is provided as particles of the MR fluid grow larger, and wherein, if the electromagnetic field is not applied to the MR fluid, a soft haptic feedback is provided as particles of the MR fluid become smaller.

15. The apparatus of claim 1, where the electromagnetic field is generated by a coil surrounding a MR fluid within the actuator.

16. The apparatus of claim 1, wherein a signal controlling the electromagnetic field is generated based on a change in detection of one or more sensors mounted on the haptic glove, and wherein the one or more sensors include at least one of a pressure sensor or an electromyography (EMG) sensor.

17. A non-transitory computer readable medium storing one or more instructions, wherein the one or more instructions are executed by one or more processors and control an apparatus for providing haptic feedback through a haptic glove to:

detect an object in a virtual reality (VR) space;

control an electromagnetic field for an actuator based on a magneto-rheological fluid (MR fluid) mounted on the haptic glove based on properties of the detected object; and provide haptic feedback to a user of the haptic glove using properties of the MR fluid that change based on the controlled electromagnetic field, wherein, when the actuator is compressed or extended, the MR fluid flows through a set path within the actuator and undergoes a flow mode within internal passages of the actuator and a shear mode on outer walls of the internal passages.

18. The computer readable medium of claim 17, wherein a plurality of MR fluid-based actuators are mounted on each finger of the haptic glove, and wherein the plurality of MR fluid-based actuators are connected to a fixed structure of the haptic glove using an elastic line and a non-elastic line.

19. The method of claim 1, wherein the actuator comprises:

a piston configured to compress and extend within the actuator;

a coil surrounding a space within the actuator; and the MR fluid disposed within the space.

20. The method of claim 19, wherein the actuator is a first actuator and the haptic glove further comprises:

a first fixed structure located at a tip of a finger of the haptic glove;

a first inelastic line connected between the first fixed structure and the first actuator;

a second fixed structure located at a joint of the finger;

a first elastic line connected between the first actuator and the second fixed structure;

a second actuator based on the MR fluid;

a second inelastic line connected between the second fixed structure and the second actuator;

a third fixed structure located at a hand portion of the haptic glove; and a second elastic line connected between the second actuator and the third fixed structure.

* * * * *